United States Patent
Geier et al.

(10) Patent No.: US 7,623,066 B2
(45) Date of Patent: Nov. 24, 2009

(54) SATELLITE POSITIONING SYSTEM RECEIVER TIME DETERMINATION IN MINIMUM SATELLITE COVERAGE

(75) Inventors: George J. Geier, Scottsdale, AZ (US); Thomas M. King, Tempe, AZ (US); James E. Stephen, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 743 days.

(21) Appl. No.: 10/986,699

(22) Filed: Nov. 12, 2004

(65) Prior Publication Data

US 2006/0103574 A1    May 18, 2006

(51) Int. Cl.
*G01S 1/00* (2006.01)
(52) U.S. Cl. .................................. 342/357.06
(58) Field of Classification Search ................. 342/357, 342/357.01–357.17
See application file for complete search history.

(56) References Cited

U.S. PATENT DOCUMENTS

| | | | |
|---|---|---|---|
| 5,543,804 A * | 8/1996 | Buchler et al. ......... | 342/357.08 |
| 5,787,384 A * | 7/1998 | Johnson .................... | 701/216 |
| 5,812,087 A | 9/1998 | Krasner | |
| 5,841,399 A * | 11/1998 | Yu ......................... | 342/357.02 |
| 5,945,944 A | 8/1999 | Krasner | |
| 6,058,338 A * | 5/2000 | Agashe et al. ............... | 701/13 |
| 6,430,415 B1 | 8/2002 | Agashe et al. | |
| 6,532,251 B1 | 3/2003 | King et al. | |
| 6,577,952 B2 * | 6/2003 | Geier et al. .................. | 701/214 |
| 6,618,670 B1 * | 9/2003 | Chansarkar .................. | 701/213 |
| 6,662,078 B1 | 12/2003 | Hardgrave et al. | |
| 6,707,422 B2 * | 3/2004 | Sheynblat et al. ........ | 342/357.12 |
| 6,760,582 B2 * | 7/2004 | Gaal .......................... | 455/423 |
| 6,771,625 B1 * | 8/2004 | Beal ............................ | 370/336 |
| 6,937,187 B2 * | 8/2005 | van Diggelen et al. . | 342/357.12 |
| 6,975,266 B2 * | 12/2005 | Abraham et al. ........ | 342/357.02 |
| 6,985,542 B1 * | 1/2006 | Nir et al. ..................... | 375/343 |
| 7,023,943 B1 * | 4/2006 | Guinea et al. ............... | 375/360 |
| 2003/0147457 A1 | 8/2003 | King et al. | |
| 2003/0187575 A1 * | 10/2003 | King et al. ................... | 701/213 |
| 2003/0231132 A1 * | 12/2003 | Park et al. ............... | 342/357.15 |
| 2004/0142660 A1 * | 7/2004 | Churan ...................... | 455/12.1 |
| 2004/0183724 A1 * | 9/2004 | Sheynblat ............... | 342/357.15 |
| 2004/0192330 A1 * | 9/2004 | Gaal ......................... | 455/456.1 |
| 2004/0193386 A1 * | 9/2004 | Flynn et al. ................. | 702/173 |
| 2004/0257277 A1 * | 12/2004 | Abraham et al. ........ | 342/357.09 |
| 2005/0212700 A1 * | 9/2005 | Diggelen et al. ........ | 342/357.06 |

* cited by examiner

*Primary Examiner*—Thomas H Tarcza
*Assistant Examiner*—Harry Liu
(74) *Attorney, Agent, or Firm*—Roland K. Bowler, II

(57) ABSTRACT

A method in a satellite positioning system receiver, including acquiring (210) a set of satellite positioning system satellites, determining (220) satellite subset time based on over-determined position solutions for at least two different subsets of the satellites acquired, determining (230) satellite time from at least two satellite subset times, computing (250) a position solution based on the satellite time or a refined (240) satellite time.

9 Claims, 3 Drawing Sheets

SATELLITE POSITIONING SYSTEM RECEIVER TIME DETERMINATION IN MINIMUM SATELLITE COVERAGE

FIELD OF THE DISCLOSURE

The present disclosure relates generally to satellite positioning system receivers, and more particularly to time determination in satellite positioning system receivers, for example, in Global Positioning System (GPS) enabled cellular communications devices, and corresponding methods.

BACKGROUND OF THE DISCLOSURE

Known schemes for determining time in Global Positioning System (GPS) receivers include demodulating the navigation data message modulated on the satellite carrier signal. However, this approach requires substantial time since the navigation data bit message is transmitted at a relatively low data rate. In NAVSTAR GPS, for example, the navigation data bit message is modulated at 50 bits per second (BPS). Also, the direct time acquisition approach is difficult and often not possible in weak signal environments, for example, in environments where GPS enabled cellular telephones are typically used.

Time determination approaches using a segment of the navigation data, which is known through either infrastructure broadcast or prediction, for correlation against a corresponding signal segment as disclosed, for example, in commonly assigned U.S. Pat. No. 6,532,251 entitled "Data Message Bit Synchronization And Local Time Correction Methods And Architectures" and in commonly assigned U.S. Publication No. 2003/0187575 entitled "Time Determination in Satellite Positioning System Receivers and Methods Therefor", can operate at relatively low signal to noise ratios. However, these approaches are limited to situations where time is in error by at most a few seconds, and thus these approaches are impractical when time may be in error by more than a few seconds.

In computing a navigation position solution in a satellite positioning system receiver, for example, a NAVSTAR Global Positioning System (GPS) receiver, time must be sufficiently well known to guarantee convergence to the correct solution. Where time is ambiguous, a sufficient number of satellites must be acquired to solve for the time ambiguity.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
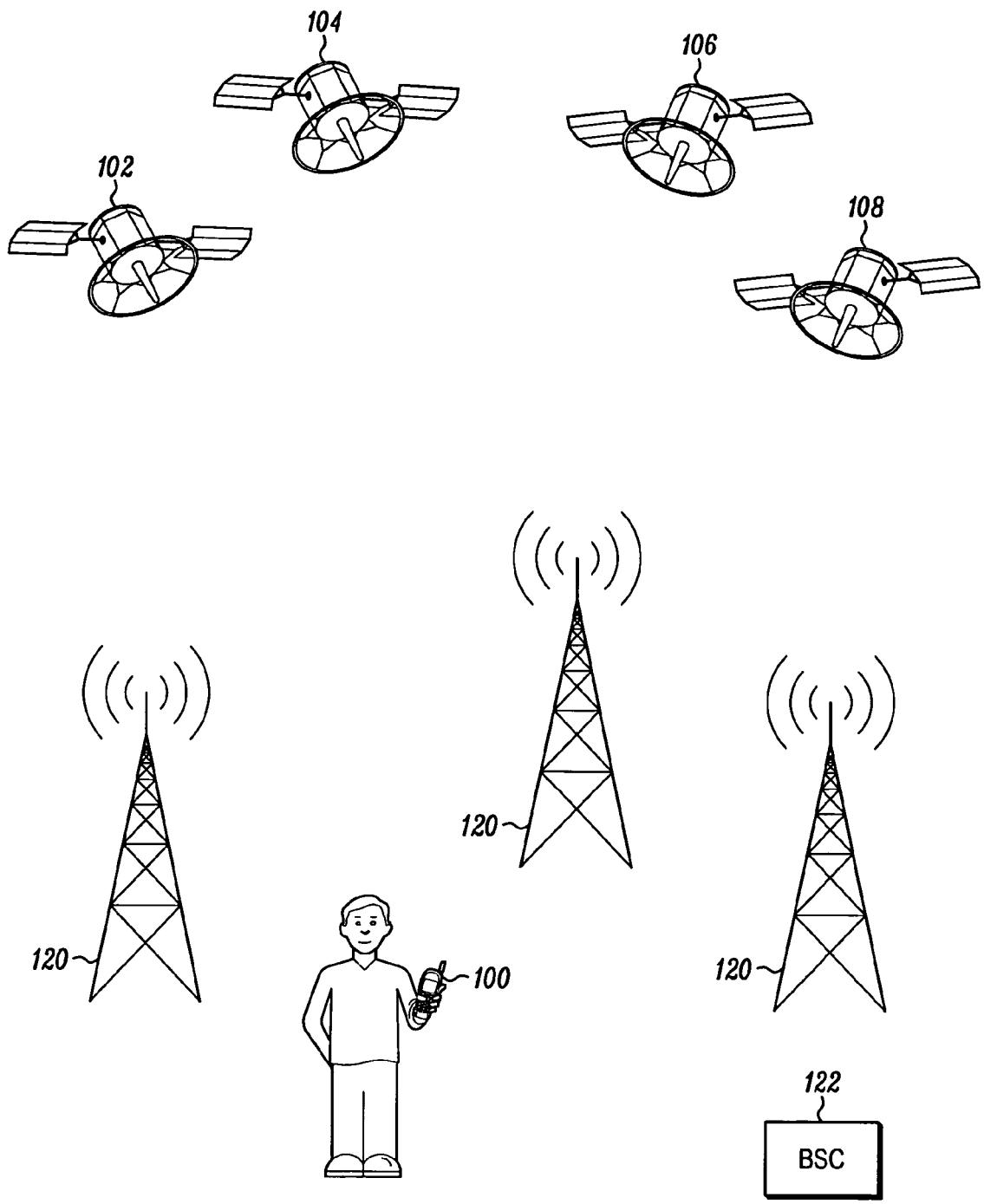
FIG. 1 is an exemplary satellite receiver in a satellite position system.

In FIG. 1, a satellite positioning system (SPS) receiver 100 receives satellite signals from multiple satellites 102, 104, 106, 108 . . . of an earth-orbiting satellite constellation. Exemplary earth-bound SPS constellations include but are not limited to the NAVSTAR GPS, GLONASS SPS and the proposed Galileo SPS. More generally the SPS constellation may orbit a celestial body other than earth, for example, a moon, or other planet. The exemplary SPS receiver 100 is an SPS receiver enabled wireless communication device in cellular communication network comprising multiple base stations 120 communicably coupled to a base station controller 122, which is communicably coupled to a location registers, a public switch telephone network, a packet network and other entities as is known generally by those having ordinary skill in the art. In other embodiments, the SPS receiver 100 is stand-alone receiver, for example, a handheld mobile SPS receiver, or an SPS receiver disposed in or on an automobile, cartage, container, or animal, or an SPS receiver in some other form.

Figure 2:
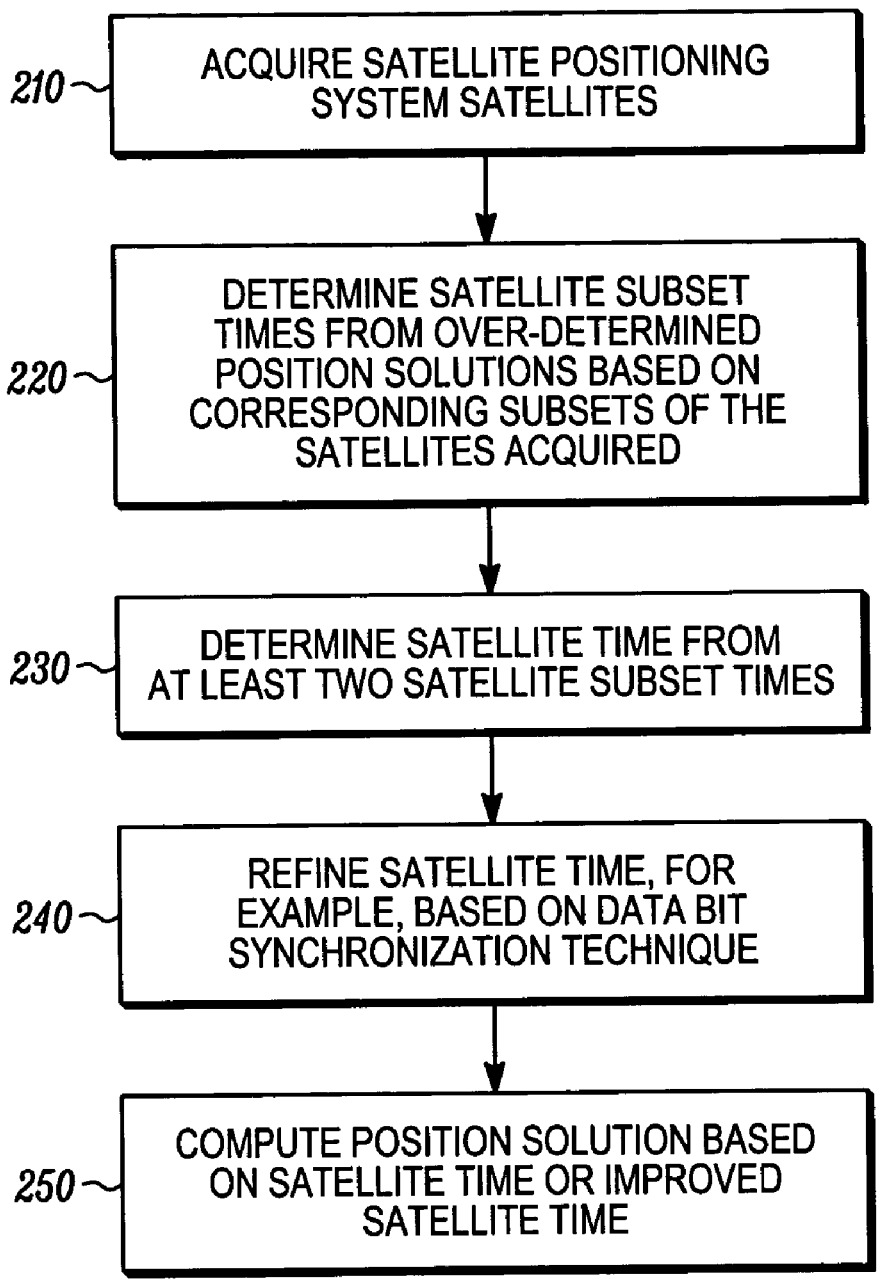
FIG. 2 is an exemplary satellite time determination block diagram.

In the process diagram 200 of FIG. 2, at block 210, the satellite positioning system receiver acquires a set of satellite positioning system satellites. Generally, in applications where the SPS receiver knows satellite time with little accuracy, for example, where the accuracy is off more than a few seconds or a minute or more, the receiver determines satellite time from at least two satellite subset times. Each satellite subset time is determined from a corresponding subset of the satellites acquired. In some embodiments, depending on the number of satellites acquired, and more particularly on the number of satellites in the subset, aiding information is used to compute the satellite subset times. For an over-determined position solution, at least five satellites are required. Alternatively, an over-determined solution may be obtained using four satellites and a single degree or dimension of aiding information, or at least three satellites with aiding in two dimensions, and so on.

Exemplary aiding information includes, but is not limited to, approximate position, altitude information, for example, based on an assumption of Mean Sea Level (MSL) altitude at an approximate position, or based on an approximate altitude supplied as part of assistance information. Exemplary aiding information also includes coarse time information, which could be generated from a prior position fix or derived from the cellular network timing. In some embodiments, the satellite time is determined from the satellite subset times by combining the subset times, for example, by averaging, examples of which are discussed further below. A new position solution is then computed using the time determined from the at least two satellite subset times. Some or all of the satellites acquired may be used to compute the new position solution.

In some embodiments, upon computing the time determined from two or more satellite subset times to within ½ a data bit period of the satellite signal, for example, to within ½ the 20 msec NAVSTAR GPS navigation message data bit period, the accuracy of the SPS time may be refined further upon synchronizing the SPS receiver with the data bit period. Time determination based on synchronization of an SPS receiver with a periodic event modulated on an SPS signal is disclosed more fully in commonly assigned U.S. Publication No. 2003/0187575 entitled "Time Determination in Satellite Positioning System Receivers and Methods Therefor", the contents of are incorporated herein by reference. A new position solution may then be computed using the refined time.

If the accuracy of the SPS time computed based on the two or more subset times is not sufficient for bit synchronization, additional measures may be required to further refine the time accuracy. In one embodiment, bit synchronization is used to determine time relative to an alternative periodic event having a less frequent repetition rate which is a multiple of the 20 msec data bit period as discussed in U.S. Publication No. 2003/0187575 entitled "Time Determination in Satellite Positioning System Receivers and Methods Therefor". Use of less frequent periodic events, for example, use of the 8 bit preamble, results in a correspondingly reduced required accuracy for the determined time (e.g., 80 msecs for the preamble). A downside associated with using periodic events which are multiple data bits is the requirement to demodulate data, which can be difficult in weak signal environments. Another alternative is to compute other satellite subset times from other satellite subsets, if additional subsets are available. And yet another alternative is to weight the multiple satellite subset solutions.

In FIG. 2, at block 220, the SPS receiver computes an over-determined position solution to solve for time for subsets of the satellites acquired. In one exemplary over-determined position solution computation embodiment, the SPS receiver acquires a set of at least 6 satellite positioning system satellites. According to this exemplary case, over-determined position solutions and corresponding satellite subset times are computed from the two or more satellite subsets, wherein each satellite subset comprises at least 5 acquired satellites. More particularly, the satellite subset times are determined using corresponding satellite subset pseudorange information of the over-determined position solutions. Thereafter, in FIG. 2 at block 230, satellite time is determined from the two or more satellite subset times. At block 240, in some embodiments, the satellite time is further refined using bit synchronization or one of the alternative schemes discussed above. At block 250, a position solution is obtained using the satellite time or the refined satellite time.

In another exemplary over-determined position solution computation embodiment, the SPS receiver acquires a set of at least 5 satellite positioning system satellites. According to this exemplary case, over-determined position solutions and corresponding satellite subset times are computed from the two or more satellite subsets and aiding information, wherein each satellite subset comprises at least 4 acquired satellites. More particularly, the satellite subset times are determined using corresponding satellite subset pseudorange information and aiding information. In one embodiment, the aiding information is an altitude constraint on the position solution. The altitude may be constrained to the local mean sea level (MSL) determined from an MSL table interpolated to the approximate position of the SPS receiver. The approximate position may be obtained as assistance information or from a prior position fix stored on the SPS receiver. Alternatively, the altitude information may be provided directly as assistance information, for example, from a cellular communication network. In embodiments where there are fewer than four satellites in each subset, additional aiding information is required to compute the over-determined position solution. Thereafter, SPS time is determined from the two or more satellite subset times, and a new position solution is computed using the determined SPS time. In some embodiments, the SPS time is further refined as discussed above. Thereafter, a position solution is obtained using the satellite time or the refined satellite time.

The number of satellite subsets from which satellite subset times can be determined from corresponding over-determined position solutions depends upon the number of satellites acquired. For example, if five satellites are available, there are five 4 satellite subsets. In some cases there may be many more satellite subset solutions than there are computation resources available. In NAVSTAR GPS applications, for example, when 12 satellites are available, there are 495 four satellite solutions, i.e., $_{12}C_4$ combinations, which is likely an excessive calculation burden on the real-time software with practical, present day hardware. In some instances therefore a scheme for reducing the number of satellite subsets is required when the number of acquired satellites exceeds a number which produces an excessive computational burden. In the exemplary embodiment of six satellites, corresponding to $_6C_4$, or 15 combinations wherein each subset includes 4 satellites, is selected as an exemplary acceptable upper limit before down-selection is performed. As noted above, for the case where each subset includes only 4 satellites, aiding information is required for an over-determined position solution from which time may be obtained.

Figure 3:
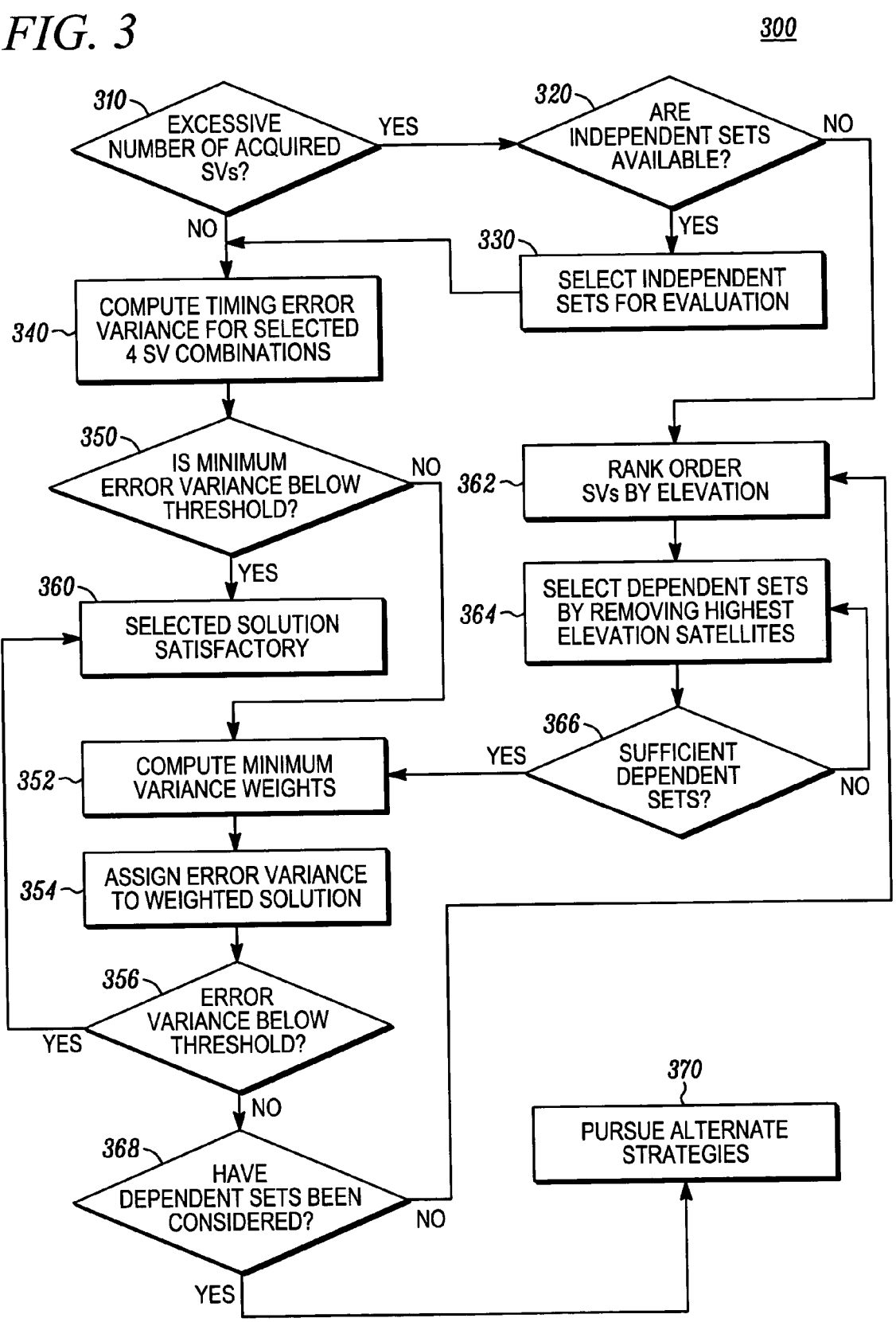
FIG. 3 is another exemplary satellite time determination block diagram.

In the exemplary process diagram 300 of FIG. 3, at block 310, a determination is made as to whether an excessive number of satellites (SVs) have been acquired. Generally, the number of satellite subsets for which satellite subset time is obtained if the number of satellites acquired exceeds the threshold, for example, more than 6 satellites. In one embodiment, if an excessive number of satellites have been acquired, a determination is made at block 320 as to whether at least two independent subsets are available. Independent satellite sets are sets or subsets that do not share common satellites. Independent sets are preferred because the errors associated with each satellite solution are statistically independent and can therefore be easily averaged to reduce the error in the composite solution, if it becomes necessary to combine solutions from multiple sets. At block 330, available independent satellite subsets are selected for further evaluation.

In FIG. 3, if the number of acquired satellites does not exceed the threshold at block 310 or upon selection of the independent satellite subsets at block 330, an error variance is computed at block 340 for each satellite subset time to determine whether any of the satellite subset times meet an accuracy threshold. If one of the satellite subset times meet the accuracy threshold, for example, if the accuracy is less than ½ the satellite data bit period, then the subset time meeting the accuracy threshold may be used in the position solution (or further refined as discussed above) without combining the satellite subset times as discussed above in connection with FIG. 2.

In one embodiment, depending upon the level of conservatism desired, the error or accuracy condition is assured by a one sigma timing error of the solution being less than 5 msecs (95% success probability), or less than 3.3 msecs (99% probability). These exemplary accuracies correspond to ensuring that the timing error is less than one-half of a data bit period, which enables sub-msec accuracy when integrated with the time associated with the nearest data bit edge. The one sigma timing error variance is computed using a covariance matrix of the solution:

$$P=(H^T R^{-1} H)^{-1} \tag{1}$$

In Eqn. (1), "H" is the measurement gradient matrix with the first 4 rows corresponding to the GPS satellites and the last row corresponding to the altitude or other aiding constraint. For an over-determined solution without the aiding information, for example, the exemplary altitude constraint, the last row of the gradient matrix corresponds to the fifth satellite. "R" is the diagonal matrix of error variances assigned to each measurement. Use of Eqn. (1) does not require prior computation of satellite subset time based on an over-determined position solution for each satellite subset. Hence, the accuracies of candidate satellite subset time solutions can be evaluated without requiring that each subset time solution be determined.

In FIG. 3, at block 350, the satellite time error variances for the satellite subsets times determined at block 340 are compared to an accuracy threshold. If the accuracy of any of the satellite subset times is adequate, the timing determination process is complete and the satellite subset time may be used to compute a position solution preferably using all of the acquired satellites at block 360. Alternatively, the satellite subset time may be further refined, as discussed above, before computing the position solution.

If the individual satellite subset times are not sufficiently accurate, then the individual satellite subset times are weighted and combined to obtain a more accurate satellite time. In FIG. 3, at block 352, minimum variance weights are computed for each of the satellite subset times. In one embodiment, corresponding to independent satellite subsets, the optimum weights are the inverse of solution error variances computed using Eqn. (1). If the process includes steps 340-350, these variances will already have been computed for each solution. Alternatively, simpler weighting schemes may be used, for example, a simple average, where, if n satellite subset times are available, each is weighted by 1/n in computing the final time estimate. Generally, the accuracy of alternate schemes will be degraded relative to the minimum variance weighting scheme, but still may satisfy the accuracy constraint. At block 354, an error variance is assigned to the satellite time based on the weighted subset times, and this error variance is compared to a variance threshold, for example, ½ a data bit period, at block 356. If the error variance assigned at block 354 meets the threshold requirement, the satellite time is used directly to compute a position solution at block 360 or the satellite time may first be refined as discussed above.

If independent sets have been selected at block 330 and minimum variance weights assigned at block 352, but the derived satellite time does not meet the accuracy threshold at block 356, then dependent satellite subsets must be considered. Because of the complexity associated with both the selection and weighting of dependent satellite sets or subsets, they are considered in flowchart 300 as a lower priority alternative. As referenced above, with six acquired satellites, a total of 15 dependent sets of four satellites can be selected. Because the satellite subsets have at least one satellite in common, the selection of weights to achieve a minimum variance satellite time takes on additional complexity. Under these circumstances, the best weighting is generally no longer the inverse of each satellite subset time solution's variance. This is because the error of each subset solution is correlated by the common satellites. Simpler weighting schemes, such as the simple average suggested above, will achieve little benefit if the correlated error component dominates each subset solution error.

The efficient selection of appropriate dependent satellite subsets is non-trivial and several strategies are possible. In one embodiment, the number of satellite is down-selected based upon satellite elevation. In FIG. 3, satellites are first rank ordered based on elevation at block 362, wherein the highest elevation satellites are removed at block 364 until a sufficient number of dependent sets are generated at block 366. This selection approach is motivated by the fact that lower elevation satellites tend to provide greater observability of time, since it is scaled by the range rate of the satellite in its effect upon the pseudo range residual. Range rates are generally larger for lower elevation satellites. For example, if seven satellites are available (implying that there are no independent sets), and the limit (15) has been exceeded for evaluation of all dependent sets, then groups of three higher elevation angle satellites are selected for elimination until a sufficient number of sets, for example, ten satellites, have been reached. To reach a total of ten dependent sets of three, the highest five elevation satellites of the original set must be considered for elimination (i.e., $_5C_3=10$). Alternative, approaches to dependent satellite set generation exist and can produce sufficiently accurate satellite times.

The exemplary weighting scheme for dependent sets explicitly evaluates the correlation between subsets, as in Eqn. (2), and uses this information to its advantage.

$$\sigma_{12} = u^T P_1 H_1^T R_1^{-1} R_{12} R_2^{-1} H_2 P_2 u \quad (2)$$

where subscripts 1 and 2 denote two separate dependent solution set values, $u^T=[0\ 0\ 0\ 1]$ is a unit vector that extracts the correlations for timing error, and $R_{12}$ denotes the error covariance matrix across the two dependent sets of pseudo range measurements.

The importance of the correlation matrix above in selecting optimum weights can be illustrated by a simple example where there are two timing solutions, with error variances $\sigma_1^2$, and $\sigma_2^2$, and error correlation $\sigma_{12}$. It can be shown that the optimum weights $w_1$ and $w_2$ are given by:

$$w_1 = (\sigma_2^2 - \sigma_{12})/(\sigma_1^2 - 2\sigma_{12} + \sigma_2^2) \quad (3)$$

$$w_2 = (\sigma_1^2 - \sigma_{12})/(\sigma_1^2 - 2\sigma_{12} + \sigma_2^2) \quad (4)$$

For $\sigma_1^2 = 2\sigma_2^2$ and uncorrelated sets (i.e., $\sigma_{12}=0$), the optimum weights are ⅓ and ⅔, respectively. However, as the correlation coefficient between the timing estimates, ρ, varies from 0.1 (lightly correlated) to 0.9 (strongly correlated), the optimum weights vary significantly, as illustrated in Table 1 below.

TABLE 1

Variation of Optimum Weights and Performance with Correlation

| Correlation Coefficient | $w_1$ | $w_2$ | Normalized Solution Error Variance | Normalized Solution Error Variance (using independent set weights) |
| --- | --- | --- | --- | --- |
| 0.1 | 0.32 | 0.68 | 0.73 | 0.73 |
| 0.5 | 0.18 | 0.82 | 0.95 | 0.97 |
| 0.9 | −0.6 | 1.6 | 0.84 | 1.22 |

An optimum weight can become negative when the correlations approach unity, implying that the combined estimate is subtracting out a component of the correlated error component. It is that case which exhibits the most improvement (roughly a 30% accuracy improvement).

Finally, if the combined dependent set timing estimate cannot meet the accuracy requirement at 368, then the process terminates and alternate means for time determination must be considered in 370, including consideration of alternate periodic events, and attempting to acquire more satellites to support a second attempt at time determination.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A satellite positioning system receiver, comprising:
 a satellite signal receiver;
 a controller coupled to the satellite signal receiver,
 the controller configured to determine time from at least two satellite subset times, the satellite subset times obtained based on over-determined position solutions for at least two different subsets of satellites acquired by the satellite signal receiver.

2. The receiver of claim 1, the controller configured to determine a satellite subset time for at least two satellite subsets, each satellite subset comprising at least five of a set of six satellites acquired by the satellite signal receiver, and the controller configured to determine time from at least two of the satellite subset times.

3. The receiver of claim 1, the controller configured to determine a satellite subset time for at least two satellite subsets using corresponding satellite subset pseudorange information and using aiding information, each satellite subset comprising four of a set of at least five satellites acquired by the satellite signal receiver, and the controller configured to determine time from at least two of the satellite subset times.

4. The receiver of claim 3, the controller configured to determine satellite subset time for at least two satellite subsets using corresponding satellite subset pseudorange information and using receiver altitude information.

5. The receiver of claim 1 the controller configured to determine time from at least two of the satellite subset times by combining the at least two satellite subset times.

6. The receiver of claim 1, the controller configured to determine a location of the satellite positioning system receiver using all acquired satellites after determining time.

7. The receiver of claim 1, the controller configured to cause the satellite signal receiver to acquire a number of satellites from which a plurality of satellite subset times may be computed from corresponding subsets of the satellites acquired, the controller configured to reduce a number of satellite subsets for which satellite subset time is obtained if the number of satellites acquired exceeds a threshold.

8. The receiver of claim 7, the controller configured to prioritize satellite subsets sharing fewer common satellites over prioritizing subsets sharing more common satellites when reducing the number of satellite subsets.

9. The receiver of claim 1, the controller configured to determine a refined time based on synchronizing the satellite positioning system receiver with periodic satellite data if an accuracy of the time determined from at least two satellite subset times is less than the period of the periodic satellite data.

* * * * *